United States Patent [19]
Rindal

[11] Patent Number: 5,107,188
[45] Date of Patent: Apr. 21, 1992

[54] METHOD AND APPARATUS FOR CANCELLATION OF MOIRÉ INTERFERENCE IN COLOR CATHODE RAY TUBE DISPLAYS

[75] Inventor: Abraham E. Rindal, Dunedin, Fla.

[73] Assignee: Sun Microsystems, Inc., Mountain View, Calif.

[21] Appl. No.: 642,817

[22] Filed: Jan. 18, 1991

[51] Int. Cl.⁵ .................. G09G 1/04; H01J 29/56; H04N 5/06
[52] U.S. Cl. ..................... 315/370; 358/150
[58] Field of Search ............ 315/370; 358/150-152, 358/328, 330

[56] References Cited

U.S. PATENT DOCUMENTS 4,887,010 12/1989 Fujimura .................. 315/370

Primary Examiner—Gregory C. Issing
Attorney, Agent, or Firm—Blakely, Sokoloff, Taylor & Zafman

[57] ABSTRACT

Visible Moiré interference is eliminated by alternately shifting the phase of the horizontal sync signal or video signals such that the phase of each video line, and hence the phase of the resulting Moiré interference associated with that video line, is also alternately shifted. The phase of the Moiré interferences are shifted such that persistence of vision in the human eye averages oppositely phased phosphor intensity variations occurring on alternating scan lines and/or vertical fields. When viewed by a user of the CRT, optical cancellation of the Moiré interference patterns results.

36 Claims, 5 Drawing Sheets

MOIRE CANCELLATION BLOCK DIAGRAM

LINE-BY-LINE

FIELD-BY-FIELD

LINE-BY-LINE AND
FIELD-BY-FIELD

METHOD AND APPARATUS FOR CANCELLATION OF MOIRÉ INTERFERENCE IN COLOR CATHODE RAY TUBE DISPLAYS

BACKGROUND OF THE INVENTION

1. Field of the Invention

The present invention discloses apparatus and methods for reducing visual interference patterns on cathode ray tube ("CRT") display devices. More particularly, the present invention discloses apparatus and methods for visually cancelling the Moiré interference phenomena on color CRTs during the display of certain video signals comprised of alternating pixel patterns.

2. Art Background

A. Moiré Background

Color cathode ray tubes ("CRTs") are commonly used as visual display devices, employing up to three electrodes, typically one for each primary color: red, green, and blue. Most color CRTs use a shadow mask to selectively illuminate a matrix of each electrode's respective colored phosphors (i.e., red, green, and blue). Referring briefly to FIG. 1, a CRT is shown with placement of a shadow mask behind a phosphor-coated screen. The shadow mask is usually a metal foil with numerous perforations which allow the electron beam sourced by a particular electrode to selectively strike its respective phosphor dot. The electron beam is focused by magnetic lenses in the CRT neck into a small spot before the electron beam reaches the shadow mask. The electron beam from the green cathode is partially occluded by the shadow mask such that the electron beam only strikes the corresponding green phosphor after passing through the shadow mask. The beam is typically larger than the shadow mask perforation size, so the shadow mask blocks part of the beam and casts a smaller shadow of the original beam onto the desired phosphor.

The dot pitch, or spacing, between adjacent shadow mask perforations, and their corresponding phosphor dots, must be as small as possible for the highest resolution. For mechanical and economic reasons, the dot pitch is generally limited to about 0.2 millimeters ("mm") to 0.3 mm for a typical high resolution display CRT. As the electron beam traverses the screen, the shadow mask includes a periodic illlumination pattern depending on whether the beam either impinges upon a perforation, and consequently the phosphor, or strikes the metal foil of the shadow mask separating the perforations. Because the sweep rate of the electron beam is known, an equivalent frequency for the resulting sinusoid can be calculated, and is referred to as the spatial frequency of the shadow mask, $v_{spatial}$. The shadow mask spatial frequency is graphically illustrated in waveform 31 of FIG. 3, and will be explained in more detail in the discussion in connection with FIG. 3.

To increase the resolution of the display, the spot size of the incident electron beam must be made as small as possible. As the electron beam spot size is reduced and begins to approach the dimensions of the phosphor dot pitch, the amount of a particular phosphor that is actually struck by the beam is a function of how well the electron beam spot is aligned to the shadow mask aperture corresponding to the intended phosphor. Moreover, it must be noted that the electron beam spot shape is not constant as the beam traverses the CRT screen. In particular, the beam spot varies from a circular shape at small angles of deflection, e.g., near the center of the CRT screen, becoming more eccentric or ovaloid at higher angles of beam deflection, e.g., near the screen perimeter. If a video pattern of alternating on-off phosphors ("pixels") is displayed, some of the pixels will be seen to be exactly aligned with the shadow mask and therefore will have uniform phosphor brightness across the dot, whereas other phosphors will exhibit a nonuniform brightness, a consequence of misalignment between electron beam and shadow mask aperture. The repeating pattern of varyingly bright pixels also is seen to be of sinusoidal form, with a frequency $v_{spot}$ equivalent to half the pixel clock frequency, where one pixel clock cycle turns on the spot, and the next pixel clock cycle turns off the pixel. The pixel video and electron beam spot frequency is graphically illustrated in waveform 32 of FIG. 3, and will be explained in more detail in the discussion in connection with FIG. 3.

As the spot size of the electron beam is reduced while viewing the on-off pattern, a periodic visual interference pattern known as Moiré is produced in each video line scanned across the CRT. The frequency $v_{Moiré}$ of the Moiré interference pattern is the difference between the spatial frequency of the shadow mask $v_{spatial}$, and the frequency of the electron beam spot $v_{spot}$, or $$v_{Moiré} = v_{spatial} - v_{spot}.$$

The Moiré frequency is graphically illustrated in waveform 33 of FIG. 3, and will also be explained in more detail in the discussion in connection with FIG. 3.

If the two frequencies $v_{mask}$ and $v_{spot}$ were identical and in-phase, the Moiré frequency $v_{Moiré}$ would zero. A Moiré frequency of zero is the ideal case, where each phosphor has a corresponding shadow mask aperture through which the corresponding electron beam travels. From a particular standpoint, however, the spot size varies as a function of the electron beam deflection angle and focus voltage. Therefore, there may be a significant variation of electron beam spot size depending on the age of the CRT and position of the electron beam on the screen. Hence, the ideal case typically cannot practicably be realized. In fact, the closer the spatial frequency and the spot frequencies are to each other, the lower the Moiré beat frequency $v_{Moiré}$ and the more visible and objectionable the Moiré interference pattern becomes. In addition, because the electron beam spot size varies across the face of the CRT, the individually scanned video lines will each produce a slightly different Moiré interference, and therefore the Moiré pattern itself varies as a function of electron beam position.

From an operating standpoint, the Moiré interference phenomenon poses a serious aesthetic problem, since the best electron beam focus and highest image resolution results in unacceptably noticeable Moiré patterns if the video signal being displayed includes alternating pixel patterns, which is a common occurrence. From the prior art teachings, the Moiré interference problem has been addressed in three ways. First, the shadow mask and phosphor dot pitch can be reduced, which raises the effective spatial frequency of the CRT, thereby raising the Moiré beat frequency so that it is less visible. The result is that in order to reduce the Moiré effect, much lower resolution images must be displayed on a CRT which is inherently capable of significantly higher resolution. Second, the electron beam can be defocused so that the spot size of the electron beam is increased, thereby decreasing the amplitude of the phosphor illumination, which in turn reduces the amplitude of the phosphor spot frequency. The lower amplitude spot sinusoid results in a decrease of the amplitude, and therefore visibility, of the resulting Moiré interference. Again, significant reduction in resolution and image quality are exchanged for only moderate reduction in Moiré interference. A third option is to avoid displaying video signals with alternating pixel or phosphor illumination patterns, and to simply tolerate the resultant Moiré interference patterns when they occur.

B. Hardware Multiplier Background

In conventional signal multipliers known in the art, AC signals are applied to two inputs and corresponding outputs are derived consisting of signals whose frequencies consist of the sum and difference of the two input signals. For example, if one input were a 51 megahertz ("MHz") sine wave and the second input were a 50 MHz sine wave, the resulting output would be two sine waves, one with frequency 101 MHz, and the other with frequency 1 MHz. The phase of the output waveforms are directly related to the phases of the two input signals. For example, if the second input were shifted in phase by 45 degrees, the output signals would also shift by 45 degrees, even though the periods of the input and output signals are vastly different. The phase-shifting of input signals permits the introduction of a time-shift, or delay, in the output signals. In the case of the exemplary input frequencies given above, a 45 degree phase shift in the 50 MHz signal corresponds to a time shift of 2.5 nanoseconds. The resulting 1 MHz output signal, also phase-shifted by 45 degrees, corresponds to a time shift of 12.5 microseconds, a four decade increase in time delat. The phase-shifting "multiplier-effect" AC multipliers can be used to good advantage in producing large output phase shifts for small differences in input phase.

As will be desfribed, the present invention overcomes the problem of Moiré interference in color CRTs without sacrificing resolution or brightness of the displayed image.

SUMMARY OF THE INVENTION

The present invention provides apparatus and methods for visually eliminating Moiré interference patterns on color cathode ray tube ("CRT") display devices by alternately shifting the phase of the video horizontal sync signal. A video image appearing on a CRT is formed of a sequence of video scan lines, scanned across the CRT one line at a time by an electron beam. A video sync phase delay module delays the sync signal to alternating scan lines by up to one half of the video pixel clock period. The video sync phase delay module is comprised of a digital counter and a two phase shifters. The counter is a D-type flip-flop which is clocked by a Sync In signal obtained from the electron beam sweep control electronics, which Sync In signal is first inverted. The Q-bar output of the flip-flop is coupled to the data-input so that opposite logic states are latched into the input of the flip-flop on consecutive clock, i.e., sync, cycles. The outputs Q and Q-bar comprise essentially half-frequency sync signals, i.e., signals of magnitude equal to, but with half the frequency of, the sync signal. The Q and Q-bar outputs are each coupled to one of two phase shifting delay paths. Each phase shifting delay path includes a two-input NOR gate, whose inputs are the sync signal and, respectively, Q-bar and Q. One phase shifting delay path also contains a resistor-capacitor pair which phase delays the input signal relative to the other phase shifting delay path. The outputs of the phase shift delay paths are subsequently combined in a NOR gate serving as a digital adder to form a composite Delayed Sync Out signal. When summed, the phase shifting delay paths together create logic pulses which correspond to either the sync signal, or the sync signal delayed up to half a period of the video pixel clock, i.e., shifted in phase by as much as 180 degrees. One delay path may be adjusted to permit the degree of shift to be varied from a minimum of 0 degrees to a maximum of 180 degrees.

By shifting the timing, or phase, of when a particular video scan line is scanned across the CRT screen relative to the preceding scan line, the phosphors forming the consecutively scanned lines will be caused to luminesce with a periodic brightness opposite in phase to the immediately preceding scan line. The Moiré interference pattern associated with any given line is also shifted in phase relative to an unshifted scan line. Consequently, as a video image is formed on the CRT of scan lines alternatively delayed and not delayed, the resultant Moiré pattern associated with the image is a series of Moiré interference lines, each Moiré line opposite in phase to the preceding and succeeding Moiré interference lines. Persistence of vision of the human eye functionally sums the individual opposite phase interferences to a net zero interference condition.

The hardware implementation may be used with either the horizontal or the vertical sync signals of a CRT, permitting visual cancellation of the Moiré interference pattern on either a line-by-line or on a field-by-field basis. When cancelling the Moiré interference pattern by the field-by-field method, the phase shift occurs after an entire field has been scanned. Therefore, the oppositely phased phosphor illumination resulting in cancellation of the Moiré pattern occurs on the same video line, one screen, or field, after the first phase video line is scanned.

BRIEF DESCRIPTION OF THE DRAWINGS

The objects, features and advantages of the present invention will be apparent from the following detailed description in which.

DETAILED DESCRIPTION OF THE INVENTION

A video sync phase delay module and methods of operation are disclosed. In the following description, for purposes of explanation, specific numbers, times, signals, signal timing, architectures, etc. are set forth in order to provide a thorough understanding of the preset invention. However, it will be apparent to one skilled in the art that the present invention may be practiced without these specific details. In other instances, well known circuits and devices are shown in block diagram form in order not to obscure the present invention unnecessarily.

Figure 1:
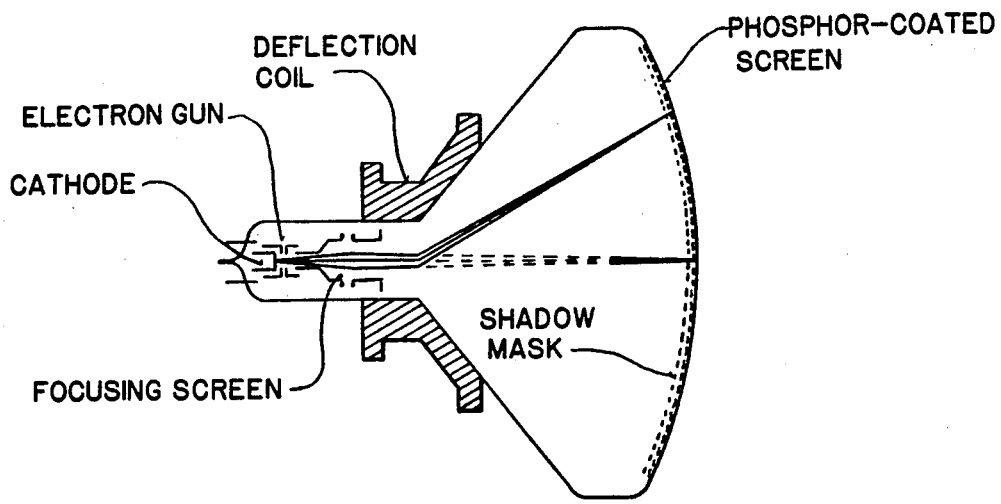
FIG. 1 illustrates a cathode ray tube ("CRT") display containing a shadow mask.
Figure 2:
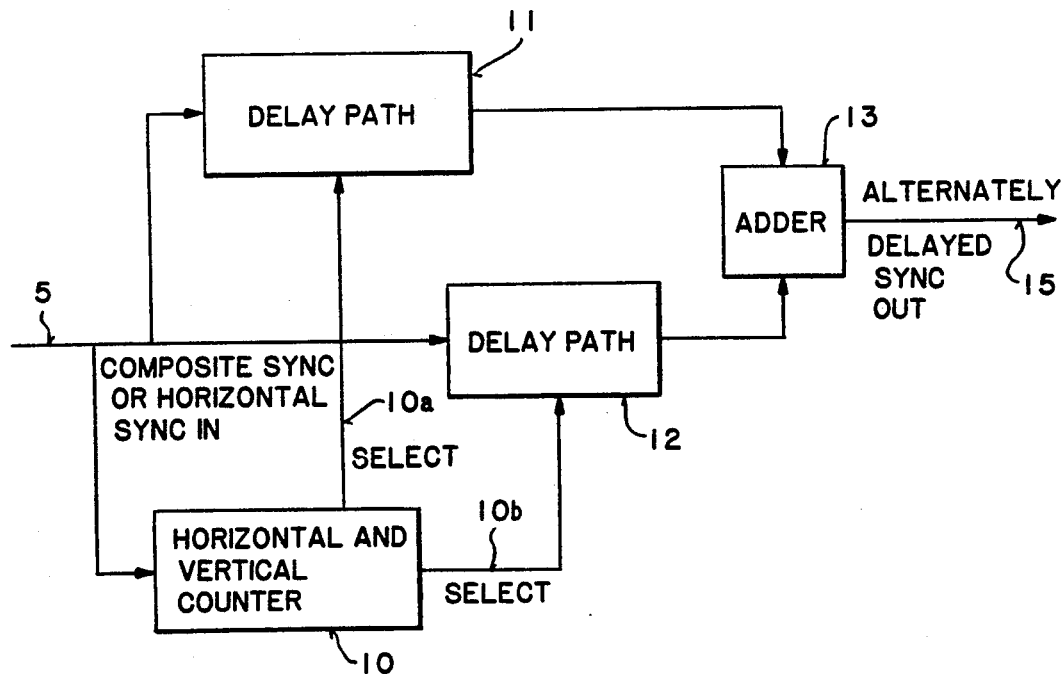
FIG. 2 is a block diagram of the sync phase shift delay module used with line-by-line cancellation.

Referring to FIG. 2, a block diagram giving an overview of a phase delay module comprising present invention is shown. A Sync In signal 5 is provided to the phase delay module from a sweep control circuit (not shown) controlling the cathode ray tube ("CRT") electron beam. In the preferred embodiment, either the composite sync or a horizontal sync signal can be used as Sync In signal 5. Sync In 5 is coupled to a Horizontal and Vertical Counter 10, a first Delay Path 11, and a second Delay Path 12. Horizontal and Vertical Counter 10 has two outputs, Select 10a and Select 10b, respectively coupled to Delay Path 11 and Delay Path 12. Select 10a and Select 10b determine which delay path will function at any given time. In the preferred embodiment, Select 10a and Select 10b are alternately chosen such that only Select 10a or Select 10b will be enabled at any time. As a result, either Delay Path 11 or Delay Path 12 will control the delay function, and thus the phase of the output signal. Delay Path 11 and Delay Path 12 each have an output, which are each coupled to an Adder 13. In Adder 13, the signals delayed relative to one another are combined to create a single Delayed Sync Out signal 15, wherein alternating pulses are delayed. The amount of delay is determined by the phase delay induced by Delay Path 12 relative to Delay Path 11.

Figure 3:
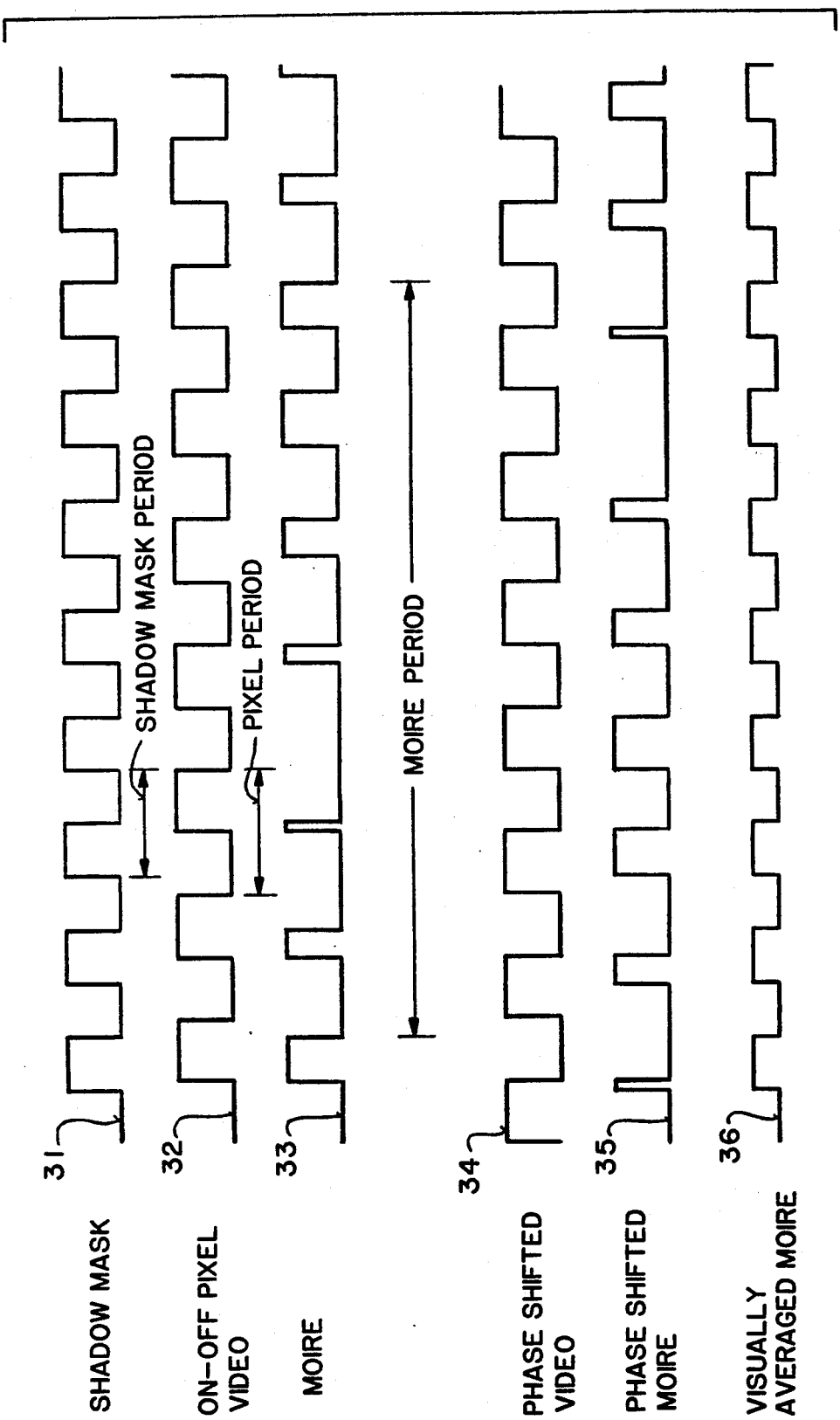
FIG. 3 illustrates shadow mask and video waveforms, and resulting Moiré interference patterns with and without delayed sync signals.

Referring now to FIG. 3, the representative waveforms for the shadow mask and video are shown, as well as resulting Moiré interference patterns with ordinary sync signals and with delayed sync signals. For purposes of the following discussion, electron beam spot intensities are shown as square digital waveforms, wherein the beam is either "on" or "off". Similarly, the intensities of the phosphors illuminated by the electrons are shown as either "on" or "off", and the resulting Moiré interference patterns as either "bright" or "dim". In reality, the electron density within the electron beam and impinging on the individual phosphors has a Gaussian distribution, so that the associated phosphor illumination and resulting Morié interferences also would have Gaussian responses. However, the Gaussian distribution is shaped by the partial blocking of the shadow mask. Thus, the squarewave approximation is accurate for purposes of graphical illustration of the Moiré interference problem. In waveform 31, the shawdow mask perforations are shown repeating with period $P_{spatial}$ across the CRT screen. The "high" region represents the perforation within the shadow mask, and the "low" region represents the metal foil forming the shadow mask.

As previously mentioned, the shadow mask spatial frequency is the equivalent frequency of perforations illuminated by the scanning electron beam. In waveform 32, the on-off pixel video signal turning on and off the electron beam is shown. The pixel video signal shown in waveform 32 is similar to waveform 31, but with slightly different period $P_{spot}$. The somewhat different period represents an electron beam spot size which is larger than the shadow mask perforations but very close to the shadow mask's spatial frequency $\nu_{spatial}$. A "high" region signifies that the electron beam is "on", and thus a pixel is "on", whereas a "low" region represents the electron beam is "off", and thus the pixel is "off". Because of the different periodicities, sometimes the pixel video signal sometimes is seen to be more aligned, and at other times less aligned, with the perforations of the shadow mask. The actual illumination of the phosphor dots is induced by electrons which pass through the shadow mask opening during the pixel video "on" pulse.

As a result of the two different periods, and hence frequencies, some phosphors are illuminated by a higher electron beam density than other phosphors. A Moiré interference pattern is thereby created on the line of phosphors scanned by the electron beam, as shown in waveform 33. In waveform 33, the Moiré pattern is also periodic, as are the shadow mask openings and the pixel video signal, but is of a much longer period $P_{Moiré}$. In fact, the Moiré period $P_{Moiré}$ is seven times longer than the shadow mask period $P_{spatial}$ in this case.

The essence of the present invention turns on the observation that if the on-off pixel video signal for a current video scan line were to be shifted in phase relative to the previous video line, the Moiré pattern for the current scan line also would be shifted in phase. In waveform 34, a pixel video signal shifted by 180 degrees relative to pixel video in waveform 32, is shown. When waveform 34 is impressed on the shadow mask with periodicity $P_{spatial}$ illustrated in waveform 31, a "phase-shifted" Moiré pattern is produced, and is shown in waveform 35. The phase-shifted Moiré interference of waveform 35 is of the same period $P_{Moiré}$ as waveform 33, but is seen to be shifted 180 degrees in phase. In waveform 35, the Moiré interference is noted to be "bright" just where the Moireé interference in waveform 33 is seen to be "dim". When visually "averaged" together, waveforms 33 and 35 result in a uniform waveform with period equal to the shadow mask $P_{spatial}$. Due to both persistence of vision in the human eye and the luminescence of the phosphor dots, a video line scanned across the CRT is seen together with the previous and following scanned lines. Thus, the eye visually averages the opposite phase "Moiré interference waveforms, and the interference is "visually" cancelled. Although the periodic Moiré interference is still present in each line scanned, the present invention constrains similarly phased interference patterns to every other scan line on the CRT. Because a typical CRT will scan more than 240 lines to form a full-screen image, the Moiré interferences are caused to reverse phase more than 120 times. Thus, in a large-area image, the eye will not distinguish the localized Moiré interference of one scan line relative to the opposite phase Moiré interference of the previous and following scan lines.

In a conventional CRT, the position of the video on the screen can be shifted in two ways. Either the video signal can be delayed, or the digital sync signal, which is used as a positional reference, can be delayed. In the preferred embodiment, the digital sync signal is alternately delayed.

Figure 4:
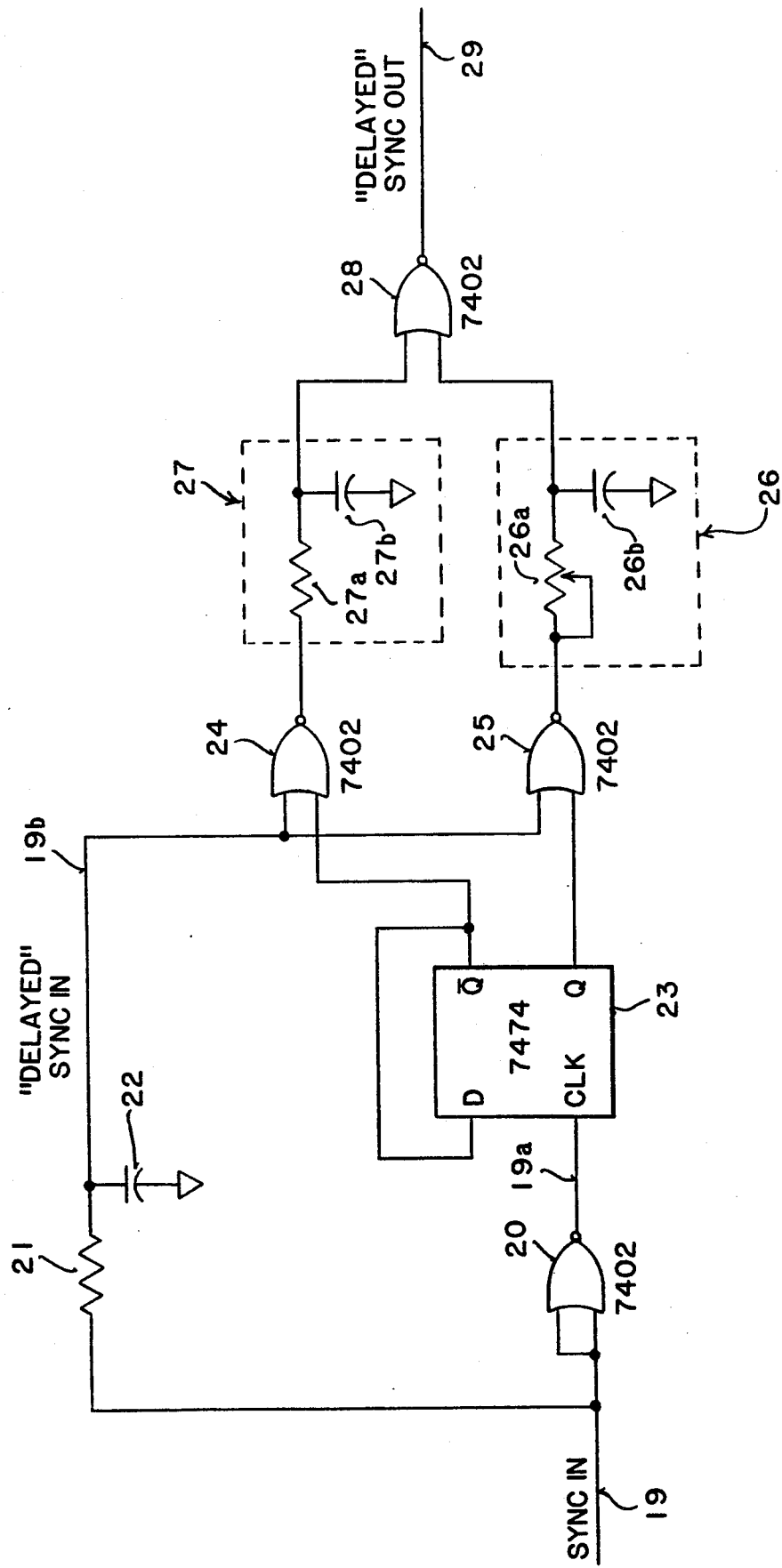
FIG. 4 is a schematic of the hardware used to implement the phase delay function.

Referring now to FIG. 4, a schematic of the hardware components comprising the phase delay module is shown. In FIG. 4, an input video Sync In 19 signal is obtained from circuitry controlling the deflection coils of the CRT (not shown). Sync In 19, is passed through both inputs of a NOR gate 20, which serves to invert Sync In 19, forming inverted Sync In 19a. Inverted Sync In 19a is connected to the clock input of a divide-by-2 counter 23. In the preferred embodiment, counter 23 is constructed of a D-type flip-flop, with the Q-bar output coupled to the Data input. On every leading edge transition of the clock input provided by gate 20, the flip-flop comprising counter 23 will toggle between logic "high" and logic "low" states. Thus, the output waveform from counter 23 will be the input waveform at half-frequency. Moreover, because the flip-flop comprising counter 23 has two outputs, Q and Q-bar, counter 23 serves to provide two alternative lines, only one of which is logic "high" at any given time. In essence then, counter 23 provides a pair of select lines corresponding to Select 10a and Select 10b discussed in connection with FIG. 2 above.

Following counter 23, a pair of two-input NOR gates 24 and 25 each receive one of the two outputs from counter 23. In particular, gates 24 and 25 are two of the four gates on a conventional type 7402 quad NOR chip, with one input of gate 24 coupled to receive the Q-bar output from counter 23, and one input of gate 25 coupled to receive the Q output. The remaining input of each gate 24 and 25 is coupled to receive a "delayed" Sync In signal 19b from the deflection electronics. The "delayed" Sync In signal 19b is obtained by passing Sync In through an RC filter comprised of resistor 21 and capacitor 22, wherein the time constant of the RC combination retards Sync In such that the flip-flop comprising counter 23 has sufficient time to switch. In the present embodiment, a 120 ohm resistor is used for resistor 21, and a 200 picofarad capacitor is used for capacitor 22.

As stated above, gates 24 and 25 are configured such that either one or the other is "selected" by counter 23 at any time. The result is obtained from the logical operation of a two-input NOR gate, wherein a logic "high" is output only when both inputs are logic "low" and the output is "low" under all other conditions, namely when the inputs are either low/high, high/low, or high/high. Both gates 24 and 25 thereby operate such that an output is obtained from each gate only every other Sync In signal 19, that is, every other clock cycle of counter 23. Following gate 25, a variable delay RC circuit 26 is formed by variable resistor 26a and capacitor 26b. Together, variable resistor 26a and capacitor 26b permit the output signal of gate 25 to be delayed relative to the output of gate 24, depending on the resistance chosen. In the preferred embodiment, a nominal resistance of 1 kilohm is chosen for variable resistor 26a and a capacitance of 33 picofarad is chosen for capacitor 26b forming RC delay circuit 26. In addition, a fixed delay combination 27 formed by a resistor 27a and a capacitor 27b may be used to delay the output of gate 24 depending on the particular hardware used to implement the present invention. Laboratory experience with the phase delay module of the present invention suggests values of 100 ohms for resistor 27a and 22 pf for capacitor 27b may be tried to obtain ideal results. Finally, the delayed outputs from gates 24 and 25 are coupled to the inputs of an adder formed by two-input NOR gate 28. Gate 28 serves to combine, or "add", the output from alternatively selected gates 24 and 25. The output of gate 28 forms on single Delayed Sync Out waveform 29. Delayed Sync Out 29 is then used to drive the scan control electronics for the CRT deflection coils.

Figure 4A:
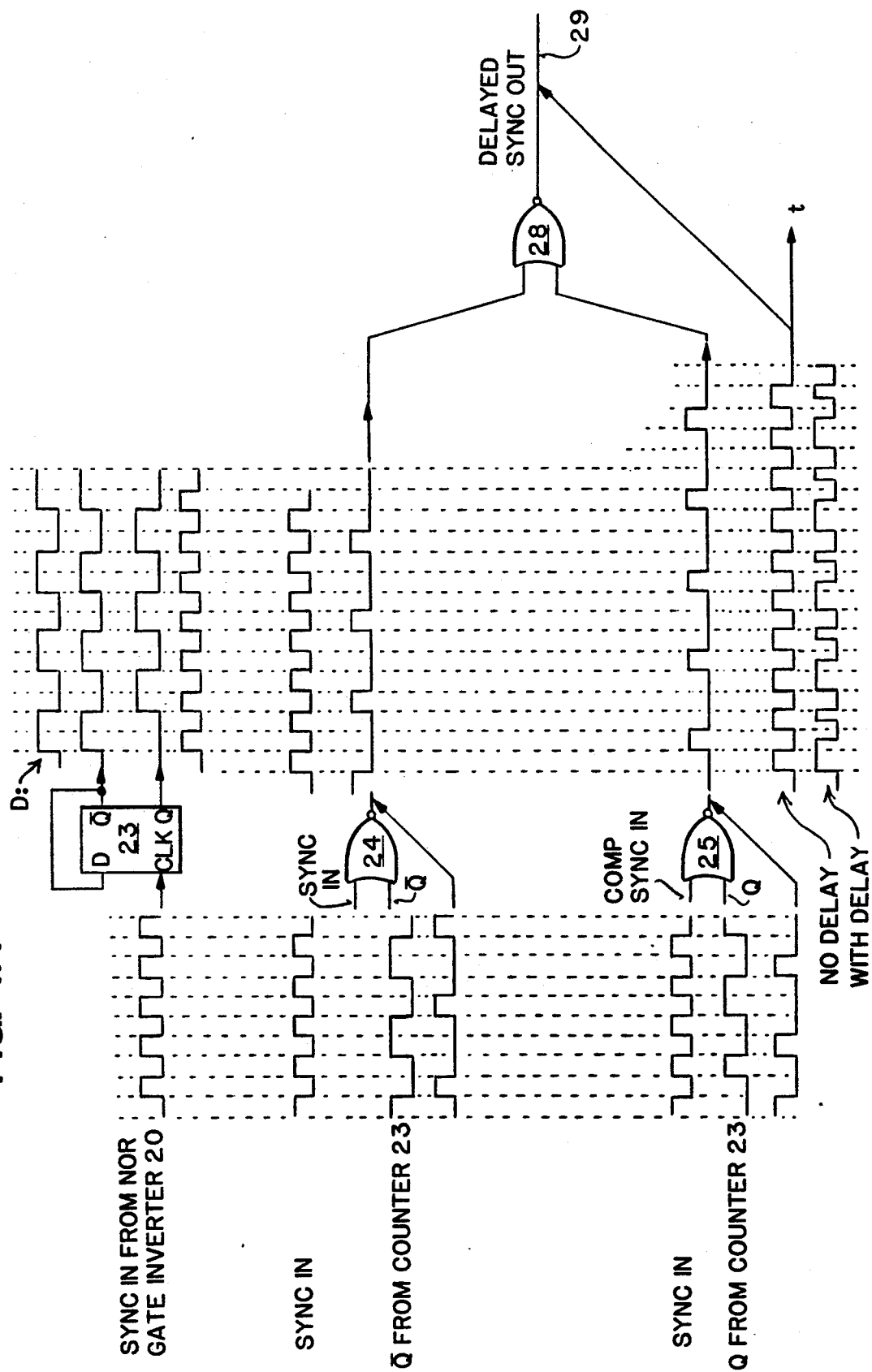
FIG. 4a is a timing diagram of the components comprising the phase delay module.

Attention is directed briefly to FIG. 4a, wherein a timing diagram for the several component parts of the phase delay module is shown. In FIG. 4a, the Sync In input waveform is shown as a square wave. Following gate 20, Sync In is inverted, forming the clock input signal of counter 23. Because counter 23 toggles only on leading edge transitions, the outputs Q and Q-bar of counter 23 are half the frequency of the clock input signal. Moreover, because gates 24 and 25 only produce an output when both input are logical "low", the outputs of gates 24 and 25 are each seen to be active only on every other positive-going transition of the clock input. The adder implemented by gate 28 sums the outputs of gates 24 and 25 into a single Delayed Sync Out signal. Disregarding for a moment the effect of RC delay circuit 26, the combined Delayed Sync Out signal is seen to be the same as the Sync In signal which forms the input to the phase delay module. When RC delay circuit 26 is included, the output of gate 25 is delayed relative to the output of gate 24 by an amount of the RC time constant. The result is that the ouput waveform from gate 25 arrives at the input of adder gate 28 later than its undelayed counterpart from gate 24. Further, because gates 24 and 25 produce outputs only on an alternating basis, the summed output from adder gate 28 comprises an interleaved convolution of the individual waveforms. When the output from gate 25 is delayed relative to the output from gate 24 by the action of RC delay combination 26, the summed Delayed Sync Out output from gate 28 forms a waveform of nonuniformly spaced pulses. Thus, Delayed Snyc Out will cause the electron beam to sweep across the CRT face not at uniform intervals, but at alternately phase-shifted intervals.

Figure 5A:
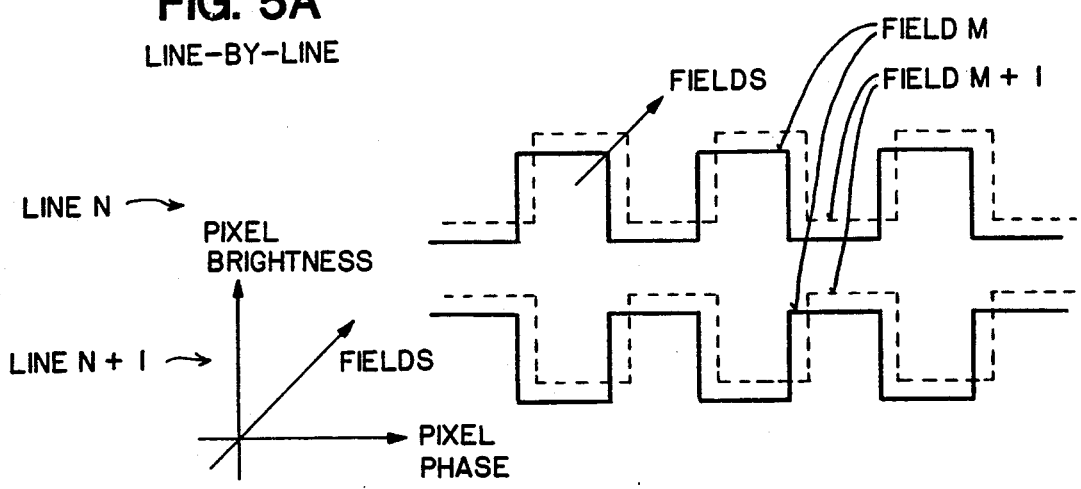
FIGS. 5a-5c are schematics showing the phases of phosphor brightness in video images employing several embodiments of the present invention.

Referring briefly to FIG. 5a, a successively scanned video lines are shown. In FIG. 5a, line-by-line Moiré cancellation as implemented by the first embodiment as shown, wherein the phase of alternately scanned lines is delayed by 180 degrees. Line N is an arbitrary horizontal video scan line which is shown to be illuminated by a pixel video signal of square form. Line N+1 is the immediately following video line scanned. Successive fields, or "screenfuls" are shown in perspective view into the paper along the "fields" axis. Note that line N+1 is opposite in phase, or shifted by 180 degrees relative to video line N.

The result is, as discussed above, that any localized Moiré interference pattern which may be formed in a scanned video line is constrained to one scan line only, because the phase-delayed Delayed Sync Out causes the subsequent scan line to produce a Moiré of shifted, or opposite, phase. Visually, the Moiré interference effect vanishes due to the nature of vision persistence "integrating" or "averaging" the alternating phases of the scanned lines into an image with uniform, nonvarying intensity. Although Moiré cancellation is best when the alternating video patterns are shifted by exactly one-half pixel, or 180 degrees there is significant amount of Moiré cancellation even when the phase shift is less. By shifting the phase of the pixel video on a line-by-line basis, the phase of the Moiré interference on horizontal line N, say, is 0 degrees, and the phase of horizontal line N+1 is 180 degrees. Because the two video scan lines are in close physical proximity, the human eye averages the two interference patterns together. The averaging process can be mathematically represented as the sum of two waveforms $W_1 = \phi_1 \sin(\omega_1 t)$, and $W_2 = \phi_2 \sin(\omega_2 t)$, where $$W_{sum} = \phi_1 \sin(\omega_1 t) + \phi_2 \sin(\omega_2 t).$$

If $W_2$ is identical frequency $\omega$ and amplitude but opposite phase to $W_1$, then, $$\omega_2 = \omega_1 \text{ and } \phi_2 = -\phi_1, \text{ so that}$$

$$W_{sum} = \sin(\omega_1 t) + (-\sin(\omega_1 t)), \text{ or}$$

$W_{sum} = 0.$

The above discussion presumes that the input Sync In to the phase delay module comprising the present invention is the horizontal sync signal. However, CRT devices typically supply both a horizontal and a vertical sync signal. If, as an alternative second embodiment, the vertical sync signal is input to the phase delay module, the CRT screen will be scanned from top to bottom in one phase, after which the electron beam is moved back to the top of the CRT screen and the image scanned delayed in phase one-half the pixel period. In such a field-by-field implementation, the phase of all horizontal lines in vertical field M is 0 degrees, and the phase of all the horizontal lines in vertical field M+1 is 180 degrees.

Figure 5B:
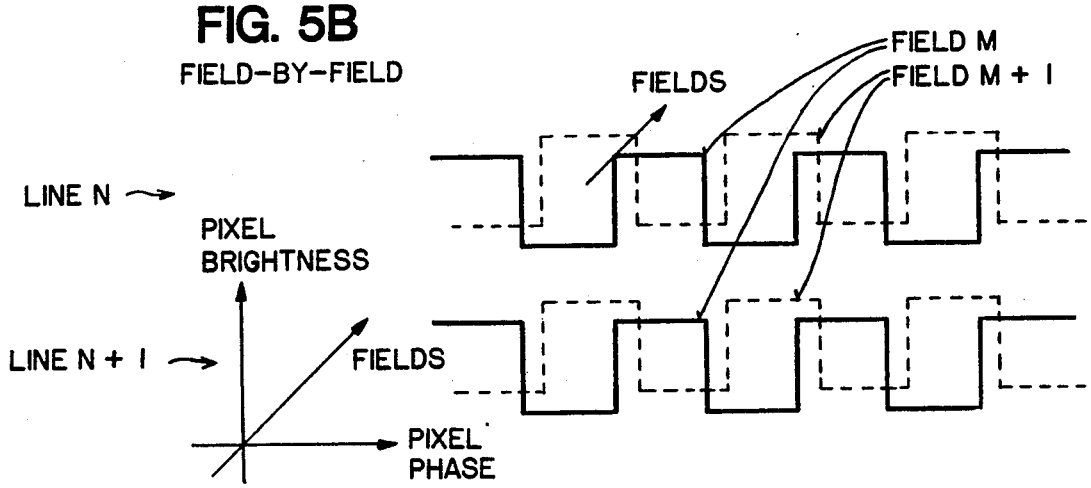

Referring briefly to FIG. 5b, the field-by-field cancellation implemented by the second embodiment is shown. In FIG. 5b, successive video lines are seen to have the same phase video signal, but successive fields are of opposite phase. Succesive fields are shown in the perspective axis into the paper. Again, persistence of vision is relied upon to average the alternately phased Moiré pattern of the same horizontal line in sequential vertical fields to a sum zero interference. Phase shifts of less than 180 degrees will result in a smaller reduction of Moiré interference.

Figure 5C:
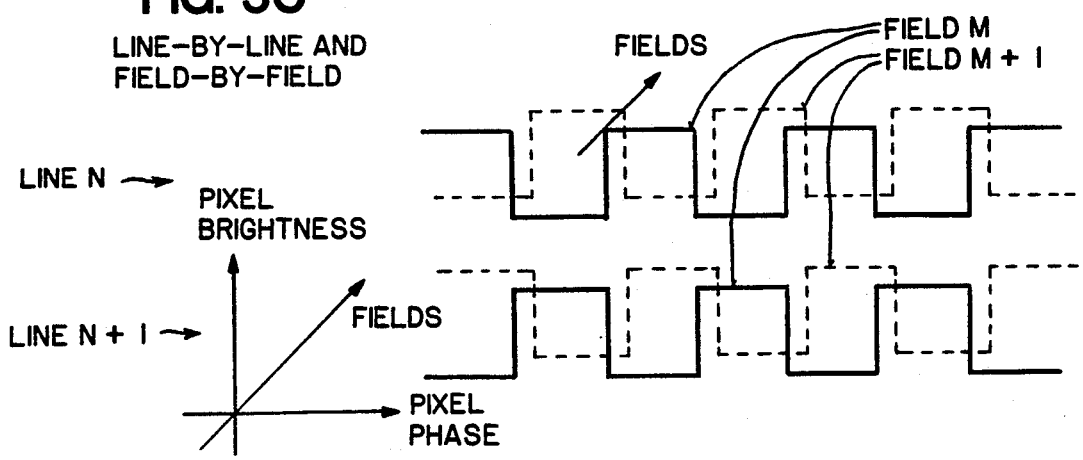

In yet a third implementation, the phase of the pixel video can be alternately reversed on both a line-by-line and on a field-by-field basis. In this third embodiment, the phase of the Moiré interference on horizontal line N is 0 degrees in vertical field M, say, and 180 degrees in vertical field M+1. Conversely, the phase of pixel video signal for horizontal line N+1 is 180 degrees in vertical field M, and 0 degrees in vertical field M+1. In this embodiment, visual elimination of the Moiré interference is again achieved by the close proximity of alternating Moiré interferences, and vision persistence between sequential fields causing the human eye to see no visible interference. This embodiment further has the advantage that there is less visible shift in the displayed video because alternate phases of the pixel video are shifted between vertical fields. As shown in FIG. 5c, the combination line-by-line and field-by-field cancellation produces oppositely phased video scans every other line of every field, or screen, and wherein each scan line is alternatively shifted in phase relative to the phase of the same line scanned one field earlier.

In a fourth embodiment, the phase of the pixel video, and thus the resulting Moiré interference may be shifted in a more gradual manner, rather than a full 180 degrees in a single line. Instead, the phase may be shifted by smaller steps in each scanned line, thereby effecting the visual cancellation over a number of lines. This is effective because the Moiré pattern to be cancelled is a relatively low frequency phenomenon distributed over a large area. The fourth embodiment has the additional benefit that the video shift per line is even less that other embodiments because the phase shift for each line is a fraction of a pixel period.

It will be appreciated by the practitioner that a tangential benefit of a shadow mask CRT is that small shifts in video position are not visible because the electron beam must be moved to essentially an adjacent perforation from a previous perforation for any intensity change to occur in the previous phosphor dot corresponding to the previous perforation. Thus, small shifts in beam position will not be detected. As a result, any error in pixel video position associated with the present invention is greatly minimized, a benefit achieved from the same source causing the Moiré interference pattern.

The foregoing has described four embodiments of a Moiré interference cancellation circuit, and associated methods for cancellation. It is contemplated that changes and modification may be made by one of ordinary skill in the art, to the materials and arrangement of elements of the present invention without departing from the spirit and scope of the present invention.

I claim:

1. A circuit to visually reduce Moiré interference in a video image displayed on a color cathode ray tube ("CRT") screen, said image including a plurality of video scan lines, said circuit comprising:
   receiving means coupled to said CRT for receiving a video sync signal, said video sync signal controlling the scanning of an electron beam generated from a electron gun in said CRT; and
   shifting means coupled to said receiving means for shifting the phase of said video sync signal such that the phase of each video scan line is shifted relative to the phase of each immediately preceding video scan line,
   said Moiré interference being thereby visually reduced.

2. The circuit as claimed in claim 1, wherein the phase of alternate video scan lines may be variably shifted from 0 to 180 degrees.

3. A circuit as claimed in claim 1, wherein said image further includes a field consisting of a screenful of said video scan lines, wherein the phase of video scan lines in alternate fields may be variably shifted from 0 to 180 degrees.

4. The circuit as claimed in claim 1, wherein siad image further includes a field consisting of a screenful of said video scan lines, wherein the phase of alternate video scan lines in alternate fields may be variably shifted from 0 to 180 degrees.

5. The circuit as claimed in claim 1, wherein said receiving means includes a D-type flip-flop.

6. The circuit as claimed in claim 5, wherein said D-type flip-flop produces two oppositely phased select signals.

7. The circuit as claimed in claim 1, wherein said shifting means includes a first and second NOR gates.

8. The circuit as claimed in claim 1, wherein said shifting means further includes a resistor-capacitor pair.

9. A method of visually reducing Moiré interference in a video image displayed on a color cathode ray tube ("CRT") screen, said image including a plurality of video scan lines, said method comprised of the following steps:
   receiving a video sync signal from the CRT, said video sync signal having a phase; and
   alternately shifting the phase of said video sync signal such that phase of each video scan line is shifted relative to the phase of each immediately preceding video scan line,
   said Moiré pattern being thereby visually reduced.

10. The method as claimed in claim 9, wherein the phase of successive video scan lines may be alternately variably shifted from 0 to 180 degrees.

11. The method as claimed in claim 9, wherein said image further includes a field consisting of a screenful of said video scan lines, wherein the phase of said video scan lines in successive fields may be alternately variably shifted from 0 to 180 degrees.

12. The method as claimed in claim 9, wherein said image further includes a field consisting of a screenful of said video scan lines, wherein the phase of successive video scan lines in successive fields may be alternately variabley shifted from 0 to 180 degrees.

13. A phase delay circuit to alternately phase-delay a sequence of video lines scanned across a color cathode ray tube ("CRT") screen, said phase delay circuit comprising:
 counter means coupled to receive a pixel video sync signal for alternately producing output first and second select signals;
 delay means for producing first and second delay components each having a phase, said delay means coupled to receive said first and second select signals, said delay means further coupled to receive said pixel video sync signal, said delay means shifting the phase of said second delay component relative to said first delay component; and
 adder means coupled to receive said first and second delay components from said delay means, said adder means summing said first and second delay components and producing an output alternately phase-delayed pixel video sync signal, coupled to said CRT;
 said alternately phase-delayed pixel video sync signal causing the CRT to scan said sequence of video lines across the screen alternately delayed in phase.

14. The circuit as claimed in claim 13. wherein said sequence of alternately phase-delayed video lines produce an image comprising alternately phase-delayed Moiré interferences forming a Moiré pattern.

15. The circuit as claimed in claim 13, wherein said alternately phase-delayed pixel video sync signal produce alternately phase-delayed video lines, said alternately phase-delayed video lines further producing an image comprising alternately phase-delayed Moiré interferences such that said image results in no visual Moiré pattern.

16. The circuit as claimed in claim 13, wherein the phase of alternate video scna lines may be variably shifted from 0 to 180 degrees.

17. The circuit as claimed in claim 13, wherein said image further includes a field consisting of a screenful of said video scan lines, wherein the phase of video scan lines in alternate fields may be variably shifted from 0 to 180 degrees.

18. The circuit as claimed in claim 13, wherein said image further includes a field consisting of a screenful of said video scan lines, wherein the phase of alternate video scan lines in alternate fields may be variably shifted from 0 to 180 degrees.

19. The circuit as claimed in claim 13, wherein said counter means comprises a D-type flip flop.

20. The circuit as claimed in claim 19, wherein said D-type flip-flop produces two oppositely phased select signals.

21. The circuit as claimed in claim 13, wherein said delay means includes a first and second NOR gates.

22. The circuit as claimed in claim 13, wherein said delay means further includes a resistor-capacitor pair.

23. The circuit as claimed in claim 22, wherein said resistor-capacitor pair delays phase of said second delay component relative to said first delay component.

24. A phase delay circuit to alternately delay a video signal to a color cathode ray tube ("CRT") electron gun sweep control circuit, said phase delay circuit comprising:
 a counter coupled to receive said video sync signal and having a first and a second output, said counter alternately producing output first and second select signals;
 a first sync delay path coupled to receive said first select signal from said counter, said first sync delay path further coupled to receive said pixel video sync signal and producing an output first delay component;
 a second sync delay path coupled to receive said second select signal from said counter, said second sync delay path further coupled to receive said pixel video sync signal and producing an output second delay component, said second delay component delayed in phase relative to said first delay component; and
 an adder coupled to receive the first and second delay components from said first and second sync delay paths, said adder summing said first and second delay components and producing an output alternately phase-delayed pixel video sync signal coupled to said electron gun sweep control circuit,
 said alternately phase-delayed video sync signal causing the electron gun sweep control to sweep the electron gun across the CRT alternately delayed in phase.

25. The circuit as claimed in claim 24, wherein said alternately phase-delayed pixel video sync signals produce alternately phase-delayed video lines, said alternately phase-delayed video lines further producing an image comprising alternately phase-delayed Moireé interferences forming a Moiré pattern.

26. The circuit as claimed in claim 24, wherein the alternately plase-delayed pixel video sync signal results in visual cancellation of a Moiré pattern.

27. The circuit as claimed in claim 24, wherein the counter comprises a D-type flip-flop.

28. The circuit as claimed in claim 24, wherein the first sync delay path includes a NOR gate.

29. The circuit of claim 24, wherein the second sync delay path includes a NOR gate.

30. The circuit fo claim 29, wherein the second sync delay path further includes a resistor-capacitor delay circuit.

31. The circuit fo claim 24, wherein said adder comprises a NOR gate.

32. A method of alternately phase-delaying a sequence of video scan lines scanned across a color cathode ray tube ("CRT") screen, by alternately delaying a pixel video sync signal to the electron gun sweep control circuit, said method including the following steps:
 producing from a sinc-in input signal a first and a second select signals, said first and second select signals having a logic "high" and logic "low" states, the phase of said first select signal opposite to the phase of said second select signal;
 alternately selecting a first and a second delay paths when said first and second select signals comprise, respectively, a logic "low" state;
 producing in said first and a second delay paths, when selected by said select signals, a first and second delayed components; and
 summing said first and second delayed components to form an alternately delayed pixel video sync-out signal such that the electron gun sweep control circuit alternately delays scanning the electron gun across the CRT screen, said alternate delayed scanning producing an image comprised of a sequence of alternately phased video lines.

33. The method of claim 32, wherein each video line contained in said sequence of video lines further comprises a Moiré interference having a phase, said Moiré interferences comprising a Moiré pattern.

34. The circuit as claimed in claim 32, wherein said sequence of alternately phase-delayed video lines produce an image comprising alternately phase-delayed Moiré interferences forming a Moiré pattern.

35. The circuit as claimed in claim 32, wherein said alternately phase-delayed pixel video sync signal produce alternately phase-delayed video lines, said alternately phase-delayed video lines further producing an image comprising alternately phase-delayed Moiré interferences such that said image results in no visual Moiré pattern.

36. The method of claim 33, wherein said alternately phase-delayed Moiré interferences, by persistence of vision, result in visual cancellation of said Moiré pattern to a viewer of said CRT.

* * * * *

UNITED STATES PATENT AND TRADEMARK OFFICE
CERTIFICATE OF CORRECTION

PATENT NO. : 5,107,188
DATED : April 21, 1992
INVENTOR(S) : Abraham E. Rindal

It is certified that error appears in the above-identified patent and that said Letters Patent is hereby corrected as shown below:

In column 10, claim 1 at line 20, please delete "a electron" and insert
-- an electron --

In column 11, claim 24 at line 68, please delete " video signal " and insert
-- video sync signal --.

Signed and Sealed this

Seventh Day of October, 1997

Attest:

BRUCE LEHMAN

*Attesting Officer*   Commissioner of Patents and Trademarks